North American layout — United States Patent document cover page.

United States Patent [19]

Breuer et al.

[11] Patent Number: 4,684,694

[45] Date of Patent: Aug. 4, 1987

[54] TRANSPARENT COATING LAYER WITH SELF-REPAIRNG AND FOG-RESISTANT PROPERTIES WHICH CAN BE UTILIZED ON PANES

[75] Inventors: Kornelia Breuer, Aldenhoven; Udo Gelderie, Stolberg; Gerhard Holzer; Helmer Raedisch, both of Aachen, all of Fed. Rep. of Germany

[73] Assignee: Saint-Gobain Vitrage, Courbevoie, France

[21] Appl. No.: 805,802

[22] Filed: Dec. 6, 1985

[30] Foreign Application Priority Data

Dec. 6, 1984 [FR] France .................................. 84 18602

[51] Int. Cl.$^4$ ............................................ C08G 18/72
[52] U.S. Cl. ..................... 524/730; 524/765; 524/769; 524/773; 528/73; 528/76; 528/77
[58] Field of Search .............. 524/730, 765, 769, 773; 528/73, 76, 77

[56] References Cited

U.S. PATENT DOCUMENTS

| | | | |
|---|---|---|---|
| Re. 32,224 | 8/1986 | Schafer et al. | 428/423.1 |
| 3,655,432 | 11/1972 | Hauslein et al. | 428/412 |
| 3,979,548 | 8/1976 | Schafer et al. | 528/44 |
| 4,584,229 | 4/1986 | Bourellen et al. | 428/216 |
| 4,584,325 | 4/1986 | Smith | 521/99 |

*Primary Examiner*—Maurice J. Welsh
*Attorney, Agent, or Firm*—Oblon, Fisher, Spivak, McClelland & Maier

[57] ABSTRACT

A high optical quality polyurethane coating layer, with self-repairing and fog-resistant properties, utilized for panes made of glass and/or plastic materials. The layer is formed from a reactive mixture composed 10 to 75% by weight of a biuret or an isocyanurate of 1,6 hexamethylenediisocyanate, having a content of about 15 to 25% weight of NCO radicals and having an average molecular weight between about 450 and 850 and comprised about 90 to 25% by weight of a polyalcohol component essentially comprised of a plurifunctional polyalcohol having about 0.4 to 17% of its percentage weight comprised of OH radicals, and having a molecular weight between about 200 and 15,000, and having ethoxy-propoxy chains, comprised 50 to 90% by weight of ethoxy radicals and 50 to 10% by weight of propoxy radicals.

17 Claims, No Drawings

TRANSPARENT COATING LAYER WITH SELF-REPAIRNG AND FOG-RESISTANT PROPERTIES WHICH CAN BE UTILIZED ON PANES

BACKGROUND OF THE INVENTION

1. Field of the Invention

This invention pertains to a transparent high optical quality polyurethane coating layer with self-repairing properties for glass and/or plastic material panes, with this layer being prepared from a reactive mixture containing a plurifunctional, specifically trifunctional, isocyanate component and a plurifunctional polyalcohol component, and possibly a catalyst and other auxiliary substances.

2. Background of the Prior Art

When coating layers of the self-repairing or self-healing anti-lacerative type are applied to silicate glass panes, they serve as anti-shattering coatings, in case the pane is broken, by preventing contact with the sharp edges of the glass fragments. Panes endowed with such coating layers are particularly well-suited for automobile safety windows and are described notably in French patent publications Nos. 2 187 719 and 2 251 608.

Coatings of this type are also known under German patent publications Nos. 2 058 504, 2 634 816, 3 201 849 as coating layers for transparent plastic materials. In this application, these polyurethane layers serve to improve resistance of the plastic materials to scratching and abrasions. These soft polyurethane layers mentioned above in fact have the property of being self-repairing, i.e., superficial imperfections in these layers spontaneously disappear after a short period of time, with the length of time generally depending on the temperature.

These known transparent polyurethane coating layers can be applied to the substratum using various processes. Thus, there is a known method of first producing sheets of this material and applying these sheets to the substratum, while placing a layer of thermoplastic adhesive between them, as described, for example, in French patent No. 2 398 606. There is also a known process of pouring or spraying the reactive mixture forming the polyurethane on the substratum to be coated, after the possible, prior application of an adhesive agent to the substratum.

The aforementioned coating layers have remarkable properties with respect to their resistance to abrasion and scratching, their transparency and their other regular-use properties. However, when they are placed under very humid conditions, atmospheric humidity can condense on their surface, forming very fine droplets of water, which can impede vision through the pane or sheet.

The purpose of the invention is to modify the highly elastic polyurethane coating layers having self-repairing properties as described above, so as to retard or significantly reduce the formation of problem condensation on their surface, in other words, especially to retard the formation of fog while retainingtheir desirable mechanical, optical and general usage properties.

SUMMARY OF THE INVENTION

In accordance with the invention, this goal is attained through the use, for the preparation of the coating layer, of a reactive mixture comprised of about 10 to 75% by weight of a biuret or an isocyanurate of 1,6 hexamethylenediisocyanate, containing about 15 to 25% by weight of NC radicals and having an average molecular weight between about 450 and 850, and about 90 to 25% by weight of a polyalcohol component, essentially comprising a plurifunctional polyalcohol containing about 0.4 to 17% by weight of OH radicals, and having an average molecular weight between about 200 and 15,000, and presenting ethoxy-propoxy chains comprised 50 to 90% by weight of ethoxy radicals and 50 to 10% by weight of propoxy radicals, and possibly a reaction catalyst and other auxiliary substances.

In accordance with the invention, the chemical composition of the self-repairing polyurethane coating is thus modified, such that it acquires hydrophilic properties and is capable of absorbing surface water vapor without leading to unacceptable modifications of the necessary mechanical properties.

Another improvement in the sense of an optimization of the mechanical as well as hydrophilic properties can be obtained by using plurifunctional polyalcohols in which the ethoxy and propoxy radicals in the ethoxypropoxy chains are found in statistical, i.e. random, distribution.

DETAILED DESCRIPTION OF THE INVENTION

The plurifunctional polyalcohol having ethoxypropoxy chains which is utilized according to the invention can be a difunctional polyalcohol comprised of 5 to 17% by weight of OH radicals, having an average molecular weight between about 200 and 600 and containing about 80% by weight of ethoxy radicals in the ethoxypropoxy chain. This difunctional polyalcohol comprises about 25 to 70% by weight of the polyalcoholisocyanate mixture. The plurifunctional polyalcohol can also be polyalcohol whose functionality is greater than 2, comprised of 0.4 to 14% by weight of OH radicals, having an average molecular weight between about 500 and 15,000 and containing about 50 to 90% by weight of ethoxy radicals in the ethoxypropoxy chains. This polyalcohol comprises about 30 to 90% by weight of the polyalcohol-isocyanate mixture.

The trifunctional polyalcohol is preferably a trimethylolpropane or glycerol and propylene oxide based polyether polyalcohol, or a trimethylolpropane or glycerol and Ecaprolactone based lactonepolyester polyalcohol.

The polyfunctional polyalcohol can also be a tetrafunctional polyalcohol comprised of 0.7 to 14% by weight of OH radicals, having an average molecular weight between about 500 and 10,000 and comprised about 10 to 80% by weight of ethoxy radicals in the ethoxypropoxy chains.

For the evaluation of the physical-mechanical properties of the self-repairing polyurethane coating layers, representative magnitudes of the E module, resistance to scratching and resistance to cracking are determined, which, together, allow it to be determined if this coating layer possesses the required self-repairing properties and usage comportment. For this purpose, the E module is determined according to the procedure described in DIN standard 53,457. To determine resistance to scratching, the process described in ECE standard R-43 is used, according to which two abrasive cylinders interact, under an applied load of 500 g, with the test piece effecting 100 rotations. For the evaluation of the abrasion resulting from this contact the measurement is next taken, according to the procedure which is also described in ECE standard R-43, of the increase in cloudiness indicated in % in comparison with the initial cloudiness before the test.

The reactive mixture which is utilized in accordance with the invention to produce the coating layer, can contain up to 15% by weight of additives such as extending agents, organic solvents, light protection agents, anti-UV agents,etc. Representative extending agents, include fluoroalkyl esters, oxyalkylenepolysiloxanes. As organic solvents, representative compounds are toluene, xylene, ethyl acetate and/or ethyleneglycol acetate. As light protecting agents, the steric inhibiting amines as anti-UV agents may be used. The substitute benzotriazoles, etc., are also susceptible of application. These additives are generally placed in the polyalcohol component and their proportions by weight are generally counted with respect to the weight of the polyalcohol.

Scratch resistance is determined according to the Erichsen process, for which one utilizes an experimental assembly such asis described in DIN standard 53 799, excepting that the conical scratching diamond utilized presents a conical angle of 50 degrees and a curve radius of 15 um at the vertex of the cone. In evaluating scratch resistance, the highest solicitation weight of the diamond for which no visible, permanent scratch can be identified on the surface is indicated.

Through experience, it has been established that transparent polyurethane coating layers can be utilized as anti-shattering coatings when the E module of these layers is between 2 and 20 N/mm2, the cloudiness increase by abrasion according to ECE R-43 is lower than 4% and the scratch resistance according to Erichsen is greater than 10 p. Also, the hydrophilic coating layers are appropriate for practical, durable use only when the properties indicated are within these limits.

To evaluate the anti-condensation effects, a process such as is described in DIN standard 4648, part 8 is applied, with the exception that the water temperature is controlled thermostatically at 40 degrees C. The period of time which passes before condensation which is visible to the naked eye begins to form on the sample piece is taken as the measurement for condensation comportment (fog appearance period). With the self-repairing polyurethane coating layers of the prior art, visible condensation begins immediately after the test piece is introduced into the measurement device.

The layer according to the invention is generally formed by pouring the reactive mixture according to the process of for example, European patent publications Nos. 0 132 198 and 0 133 090.

It can also be formed by spraying the reactive mixture or by reactive injection into a mold. The layer can be formed in situ on the pane to be coated. It can be made on a formation support from which it is subsequently removed after possibly being combined with one or several other layers of plastic materials. The sheet obtained is next applied to the substratum to constitute the desired pane.

"Layer", according to the invention, is defined as the layer on a substratum as well as in the form of an independent sheet having one or several layers.

Other characteristics and advantages of the invention will emerge in the following description of examples of the embodiment of coating layers in accordance with the invention.

EXAMPLE 1

In this example, a reactive mixture is prepared using a difunctional polyalcohol. For this purpose, 100 g of an essentially trifunctional polyisocyanate, namely, a biuret of 1,6 hexamethylene-diisocyanate having a content of 23% by weight of free NCO radicals, is caused to react with 164 g of a polyalcohol having a base of ethylene glycol and ethylene oxide/propylene oxide (gravimetric ratio: 60/40, statistical distribution) having a 5.7% by weight content of free OH radicals and an average molecular weight of about 600 grams per mole. As additives, 0.07 g of dibutyletain dilaurate ( catalyst) and 2.9 grams of oxyalkylenepolysiloxane (extending agent) are added to the polyalcohol.

The mixture is agitated at room temperature for 10 minutes. The reactive mixture, thus blended, is poured to form a layer, which is 0.5 mm thick, on plates of glass which have been heated to about 60 degrees C. The hardening reaction is conducted for 30 minutes at 90 degrees C.

After 48 hours at a constant temperature of 20 degrees C. under a 50% relative humidity, the sheets are removed and their properties are measured, which gives the following values:

E Module: $5 \pm 1$ N/mm2
Cloudiness increase
after abrasion: 1.2%
Scratch resistance: 20 p
Fog appearance time: about 30 mn The mechanical properties of this coating layer thus fall within the required limits, while condensation comportment is increased considerably.

EXAMPLE 2

For the preparation of the reactive mixture, a plurifunctional polyalcohol is utilized, being formed from a tetrafunctional hydroxyl compound, pentaerythritol. To this end, one proceeds in the following manner: 100 g of an essentially trifunctional polyisocyanate, namely a hexamethylenediisocyanatebased isocyanurate having a 21.5% by weight content of free NCO radicals, is caused to react with 93 g of a pentaerythritol and ethylene oxide/propylene oxide (gravimetric ratio: 80/20 and statistical distribution) based polyalcohol having a free OH radical content of 1.4% and an average molecular weight of about 5000 g/mole. As additives, 0.01 g of dibutyltin dilaurate (catalyst) 1 g of oxyalkylenepolysiloaxane (extending agent) and 10 g of ethyl acetate (solvent) are added to the polyalcohol.

The mixture is agitated for 10 minutes at room temperature, The reactive mixture, thus blended, is poured to form a layer, which is 0.5 mm thick, on glass plates which have been preheated to about 60 degrees C. The subsequent hardening reaction is conducted for 30 minutes at 90 degrees C.

The samples thus prepared are kept at 20 degrees C. for 48 hours, under a relative humidity of 50%. The coating layers are next removed from the glass panes and their properties are determined according to the processes indicated. Thus, the following measurement values were obtained:

E module: $11 \pm 1$ N/mm2
Cloudiness increase
after abrasion: 1.5%
Scratch resistance: 27p
Fog appearance period: about 10 mn For this coating layer as well, the mechanical properties are within the limit values required and the condensation comportment is also greatly improved.

EXAMPLE 3

A reactional mixture is prepared, in which the polyalcohol component consists of a plurifunctional polyalcohol formed from a trifunctional hydroxyl compound, trimethylolpropane. For this purpose, 100 g of an essentially trifunctional polyisocyanate, namely a biuret of 1,6 hexamethylenediisocyanate having a free NCO radicals content of 23% by weight, is caused to react with 100 g of a trimethylolpropane and ethylene oxide/propylene oxide-based polyalcohol (gravimetric ratio: 80/20, statistical distribution) having a 1.4% content of free OH radicals and an average molecular weight of about 3800 g/mole. As additives, 0.01 g of dibutyltin dilaurate (catalyst) and 1 g of oxyalkylenepolysiloxane are added to the polyalcohol.

The mixture is agitated at room temperature for 10 minutes. The reactive mixture, thus blended, is poured to form a layer, which is approximately 0.5 mm thick, on glass plates which have been preheated to about 60 degrees C. The layers are again hardened at a temperature of 90 degrees C. for 30 minutes.

The samples thus prepared are kept again at 20 degrees C. for 48 hours, under a relative humidity of 50%. The properties of the coating layers are then determined, with the measured values obtained as follows:
E Module: $10 \pm 1$ N/mm2
cloudiness increase
after abrasion: 1.3%
Scratch resistance: 28 p
fog appearance time: about 25 mn In this case as well, the mechanical properties are within the indicated limits, while condensation comportment also assumes an exceptionally favorable value.

EXAMPLE 4

A reactive mixture is prepared, in which the polyalcohol component consists of a tetrafunctional polyalcohol formed from ethylenediamine. For this purpose, 100 g of an essentially trifunctional polyisocyanate, namely a biuret of 1,6 hexamethylenediisocyanate having a free NCO radical content of 23% by weight, is caused to react with 138 g of an ethylenediamine and ethylene oxide/propylene oxide-based polyalcohol (gravimetric ratio: 80/20, statistical distribution) having a 6.8% content of free OH radicals and an average molecular weight of about 1000 g/mole, in a solution of 100 ml of toluol as a solvent. As additives, 0.05 g of dibutyltin dilaurate (catalyst), and 0.1 g of fluorated alkyl ester (extending agent) are added to the polyalcohol.

The mixture is agitated at room temperature for 10 minutes. The reactive mixture, thus blended, is converted in the same manner as described in the above examples, into hardened sheets on which the indicated measurements are conducted. The measured values thus obtained are as follows:
E Module: $11 \pm 1$ N/mm2
cloudiness increase
after abrasion: 0.75%
Scratch resistance: 18 p
fog appearance time: about 10 mn This layer presents the properties required for use in panes.

EXAMPLE 5

A reactive mixture is prepared, in which, among others, a trifunctional trimethylolpropane and propylene oxide-based polyether polyalcohol is used. For this purpose, 100 g of an essentially trifunctional polyisocyanate, namely a biuret of 1,6 hexamethylenediisocyanate having a free NCO radical content of 23% by weight, is caused to react with 134 g of a pentaerythritol and and ethylene oxide/propylene oxide-based polyalcohol (gravimetric ratio: 80/20, statistical distribution) having a 1.4% content of free OH radicals and an average molecular weight of about 5000 g/mole and also, with 13 g of a trimethylolpropane and propylene oxide-based polyalcohol, having an 11.5% content of free OH radicals by weight and an average molecular weight of about 450 g/mole. As additives, 0.01 g of dibutyltin dilaurate (catalyst), and 1 g of oxyalkylenepolysiloxane (extending agent) are added to the polyalcohols.

The mixture is agitated at room temperature for 10 minutes. The reactive mixture, thus blended, is converted in the same manner as described in the above examples, into hardened coating sheets on which the indicated measurements are conducted. The measured values thus obtained are as follows:
E Module: $8 \pm 1$ N/mm2
cloudiness increase
after abrasion: 1.2%
Scratch resistance: 12 p
fog appearance time: about 5 mn In this case as well, the mechanical properties are within the aforementioned limits. Condensation resistance is also so remarkable that this coating layer can also be considered as condensation free under the conditions of a practical application of such coating layers.

The coating layer according to the invention can advantageously be combined with a layer of plastic material having adhesive properties and/or energy absorbant properties such as described, for example, in French patent publications No. 2 398 606 and European patent publications Nos. 0 054 491, 0 132 198 and 0 133 090 to form a two-layer sheet which can especially be utilized in compound safety glass.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Transparent polyurethane coating layer with self-repairing properties for glass and/or plastic material panes, formed from a reactive mixture consisting essentially of 10-25% by weight of a trifunctional isocyanate component and 90-25% by weight of a plurifunctional polyalcohol component, wherein said isocyanate component consists essentially of 10 to 75% by weight of a biuret or isocyanurate of 1,6 hexamethylenediisocyanate consisting of about 15 to 25% by weight of NCO radicals and having an average molecular weight between about 450 and 850 and said polyalcohol component consists essentially of a plurifunctional polyalcohol comprised of about 0.4 to 17% by weight of OH radicals and having an average molecular weight between about 200 and 15,000, as well as ethoxy-propoxy chains comprised about 50 to 90% by weight of ethoxy radicals and about 10 to 50% by weight of propoxy radicals in the ethoxy-propoxy chains.

2. Coating layer according to claim 1, wherein the ethoxy and propoxy radicals are found in random distribution in the ethoxy-propoxy chains of the plurifunctional polyalcohol.

3. Coating layer according to claim 1 wherein the reactive mixture contains 25 to 70% by weight of a difunctional polyalcohol comprised of 5 to 17% by weight of OH radicals, having an average molecular weight between about 200 and 600 and comprised about 80% by weight of ethoxy radicals in the ethoxy-propoxy chain.

4. Coating layer according to claim 1, wherein the reactive mixture is comprised 30 to 90% by weight of a polyalcohol having a functionality greater than 2, comprised of 0.4 to 14% by weight of OH radicals, having an average molecular weight between about 500 and 15,000 and is comprised about 50 to 90% by weight of ethoxy radicals in the ethoxy-propoxy chains.

5. Coating layer according to claim 4, wherein the polyalcohol having a functionality greater than 2 is formed from at least one of trimethylolpropane and glycerol.

6. Coating layer according to claim 4, wherein the polyalcohol with functionality greater than 2 is formed from a pentaerythritol.

7. Coating layer according to claim 5, wherein about 80% by weight of ethoxy radicals and about 20% by weight of propoxy radicals are found in random distribution in the ethoxy-propoxy chains.

8. Coating layer according to claim 1, wherein the reactive mixture contains 40 to 70% by weight of a tetrafunctional polyalcohol containing 0.7 to 14% by weight OH radicals, having an average molecular weight of about 500 and 1,000 and containing about 10 to 80% by weight of ethoxy radicals in the ethoxy-propoxy chains.

9. Coating layer according to claim 8, wherein the tetrafunctional polyalcohol is formed from ethylenediamine.

10. Coating layer according to claim 1, wherein the polyalcohol component of the reactive mixture also contains up to 50% by weight of a trifunctional polyalcohol having an average molecular weight between about 400 to 1000 and contains 8 to 14% by weight of OH radicals.

11. Coating layer according to claim 10, wherein the trifunctional polyalcohol is a trimethylopropane or glycerol and proplyene oxide-based polyether polyalcohol.

12. Coating layer according to claim 10, wherein the trifunctional polyalcohol is comprised of a lactone polyester polyalcohol based on the reaction product of E-caprolactone and at least one member selected from the group consisting of trimethylolpropane, glycerol and mixture thereof.

13. Coating layer according to claim 1, wherein the polyalcohol component of the reactive mixture contains up to 15% by weight of additives selected from the group consisting of flow agents, organic solvents, light protection agents, UV absorbants catalysts and mixtures thereof.

14. The coating layer of claim 13, wherein sad flow agents comprise fluorated alkyl esters or oxyalkylenepolysiloxanes, and said organic solvents are selected from the group consisting of toluene, xylene, ethyl acetate, ethyleneglycol acetate and mixtures thereof.

15. Sheet of plastic material comprising at least one coating layer according to claim 1.

16. Pane comprising a coating layer according to claim 1.

17. The coating layer of claim 10, wherein said trifunctional polyalcohol has an average molecular weight of about 400–600 and contains 16–27% weight OH radicals.

* * * * *